(12) United States Patent
Tsubota et al.

(10) Patent No.: US 7,088,641 B2
(45) Date of Patent: Aug. 8, 2006

(54) BISTATIC AZIMUTH DETECTION SYSTEM AND DETECTION METHOD

(75) Inventors: Koutarou Tsubota, Tokyo (JP); Hiroyuki Morioka, Tokyo (JP); Hiroyuki Kanesada, Tokyo (JP); Tosiaki Iwaisako, Tokyo (JP)

(73) Assignee: NEC Corporation, Tokyo (JP)

( * ) Notice: Subject to any disclaimer, the term of this patent is extended or adjusted under 35 U.S.C. 154(b) by 103 days.

(21) Appl. No.: 10/784,941

(22) Filed: Feb. 25, 2004

(65) Prior Publication Data

US 2004/0170085 A1    Sep. 2, 2004

(30) Foreign Application Priority Data

Feb. 28, 2003    (JP) .............................. 2003-052425

(51) Int. Cl.
  *G01S 15/06*    (2006.01)
  *G01S 15/46*    (2006.01)
  *G01S 3/80*    (2006.01)
(52) U.S. Cl. ..................................... 367/128
(58) Field of Classification Search ................ 367/128, 367/124, 118, 127
  See application file for complete search history.

(56) References Cited

U.S. PATENT DOCUMENTS 4,746,924 A * 5/1988 Lightfoot .................... 342/453
H1618 H    12/1996 Blume

FOREIGN PATENT DOCUMENTS

| GB | 2 320 556 A | | 6/1998 |
|---|---|---|---|
| GB | 2398872 A | * | 9/2004 |
| JP | H08-15427 A | | 1/1996 |
| JP | 2001-296359 A | | 10/2001 |
| WO | WO 97/22889 | * | 6/1997 |

\* cited by examiner

*Primary Examiner*—Daniel Pihulic
(74) *Attorney, Agent, or Firm*—Sughrue Mion, PLLC

(57) ABSTRACT

An arithmetic unit detects difference $\alpha$ (=X−Y) between a sound source arrival azimuth $X°$ of a sound wave, which is transmitted from a sound source buoy and is directly received in a wave receiving buoy, to a reference axis of the wave receiving buoy, and a target arrival azimuth $Y°$ of a reflective sound, which is reflected by a target, to the reference axis of the wave receiving buoy. The arithmetic unit detects an azimuth angle $\beta$ of the sound source buoy on the basis of position information (latitude and longitude) of the sound source buoy and wave receiving buoy that is obtained by using GPS. Then, the arithmetic unit detects the azimuth (target azimuth) of the target to a magnetic north azimuth by the operation of $(\beta-\alpha)$.

16 Claims, 8 Drawing Sheets

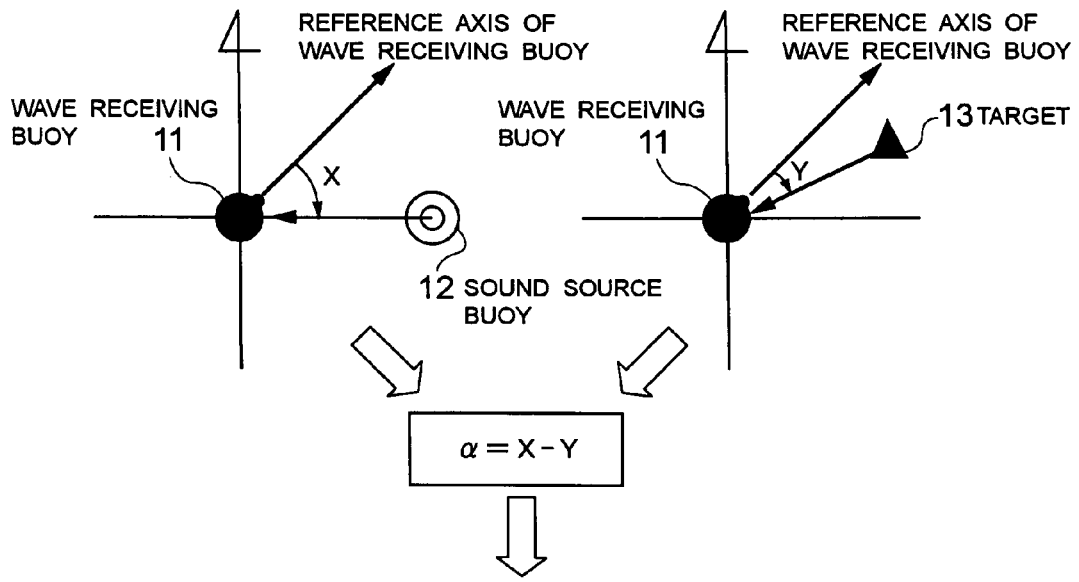
FIG. 5A SOUND SOURCE ARRIVAL AZIMUTH
FIG. 5B TARGET ARRIVAL AZIMUTH
$\alpha = X - Y$
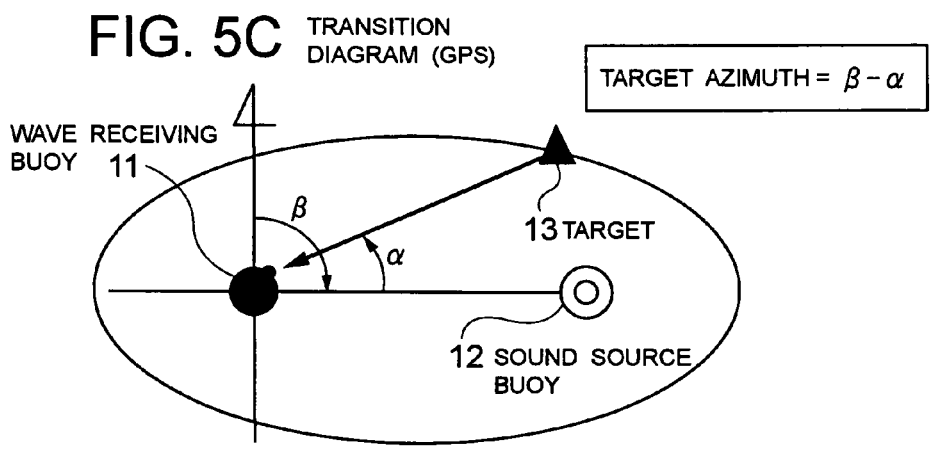
FIG. 5C TRANSITION DIAGRAM (GPS)
TARGET AZIMUTH = $\beta - \alpha$

DETECTION USING COMPASS

DETECTION USING GPS $\alpha = \theta - \Phi$

TRANSITION DIAGRAM

TARGET AZIMUTH = $\alpha + \beta$

BISTATIC AZIMUTH DETECTION SYSTEM AND DETECTION METHOD

BACKGROUND OF THE INVENTION

1. Field of the Invention

The present invention relates to a bistatic azimuth detection system and a detection method thereof, and in particular, relates to a bistatic azimuth detection system and a detection method which detect an azimuth of a target by receiving and analyzing a reflective sound, obtained by a sound which is radiated from sound source equipment and is reflected by the target in the sea, with one or more wave receiving equipment in positions different from that of the sound source equipment.

2. Description of the Related Art

FIG. 9 shows an explanatory diagram of an example of a conventional bistatic azimuth detection method. In FIG. 9, a sound wave transmitted by a sound source unit 30 is reflected by a target 31 in the sea, and the reflective sound is received in a wave receiving unit 32 installed in a position different from the sound source unit 30. The wave receiving unit 32 converts the received reflective sound into a reflective acoustic signal which is an electric signal, and outputs it to a processing unit 33. The processing unit 33 detects an azimuth, having a highest sound level, as an arrival azimuth to a reference axis of the wave receiving unit 32 by analyzing a sound level, which the wave receiving unit 32 receives for every unit azimuth, on the basis of the inputted reflective acoustic signal.

In FIG. 9, $\theta$ shows the above-described arrival azimuth. Moreover, the wave receiving unit 32 has a compass and detects a magnetic north azimuth of the reference axis of the wave receiving unit 32 to output it to the processing unit 33. In FIG. 9, $\phi$ shows the magnetic north azimuth of the above-described reference axis. Then, the processing unit 33 adds the magnetic north azimuth $\phi$ of the reference axis to the arrival azimuth $\theta$ of the reflective sound from the target 31, and detects the result as a target azimuth of the target 31.

In addition, bistatic azimuth detection equipment which automates target echo detection and target position localization is also known conventionally (for example, refer to Japanese Patent Laid-Open No. 2001-296359). The conventional bistatic azimuth detection equipment mentioned in Japanese Patent Laid-Open No. 2001-296359 comprises a signal processing unit which performs the processing of removing a narrow-band signal whose frequency is stable in time, from an acoustic signal received by a receiving unit, and emphasizing a target echo, a primary detection processing unit which extracts a signal appropriate for a target echo by setting a threshold, a secondary detection processing unit which classifies the result of primary detection processing into categories, such as a target echo, a direct wave, a submarine reflective wave, and sea noise, by a neural network, and detects the target echo, and a target position localization processing unit which calculates arrival time difference between the detected target echo and direct wave, and localizes a target existence zone by ellipse drawing to detect a target position from an intersection with a signal arrival azimuth.

Further, a signal detection system is known conventionally, the signal detection system which can distinguish whether a received echo is one from a true target or one reflected on a sea surface or a sea bottom. The signal detection system includes a plurality of directive passive sonobuoys each receiving an echo of a sound wave which a sound source sonobuoy radiates underwater, calculates an existence zone of the target, which is a sound source of echoes which they receive (including a sea surface and a sea bottom), on a two-dimensional coordinate plane for every directive passive sonobuoy from the positional relation and propagation time between the sound source sonobuoy and each of directive passive sonobuoys, cumulates an echo level for every target existence zone, and compares the echo cumulation level with a threshold level (for example, refer to Japanese Patent Laid-Open No. 7-294640).

However, the conventional bistatic azimuth detection method shown in FIG. 9 cannot perform highly accurate azimuth detection due to error factors such as the accuracy of a compass, and an earth magnetism deviation. In addition, since an azimuth detection function such as a compass is indispensable, a mechanism is enlarged and cost increases.

In addition, since the conventional equipment mentioned in Japanese Patent Laid-Open No. 2001-296359 performs classification into categories, such as a target echo, a direct wave, a submarine reflective sound, and sea noise, by a neural network, and detects the target echo, a load of a computer is large. The configuration of equipment is also complicated and expensive. Moreover, since it determines a magnetic north azimuth with a compass and estimates an existence position of a target by using an arrival azimuth of the target, it is also not possible to perform highly accurate azimuth detection due to the above-described error factors such as the accuracy of a compass, and an earth magnetism deviation.

Furthermore, since the conventional system mentioned in Japanese Patent Laid-Open No. 7-294640 calculates an existence azimuth of a target by using directional characteristics of three directive passive sonobuoys, three passive sonobuoys are required. Since each passive sonobuoy has a compass and detects a magnetic north direction, it is not possible to perform highly accurate azimuth detection due to the above-described error factors such as the accuracy of a compass, and an earth magnetism deviation.

SUMMARY OF THE INVENTION

The present invention aims at providing a bistatic azimuth detection system and a detection method thereof which can perform more highly accurate azimuth detection than the conventional regardless of errors due to the detection by a compass.

In order to achieve the above-described objects, in a bistatic system which detects a target azimuth by typically radiating a sound wave into the sea from sound source equipment, receiving a reflective sound, reflected by the target in the sea, by one or more wave receiving equipment separated from the sound source equipment, and analyzing the received wave signal, the target azimuth is detected on the basis of an azimuth of the sound source equipment which is calculated from position information on the sound source equipment and wave receiving equipment, and an azimuth of the sound source equipment which is obtained by analyzing the received wave signal.

According to the first aspect of the present invention, as shown in FIGS. 1 and 2, a bistatic azimuth detection system comprising: sound source equipment 2 which transmits a sound wave to a target 3 in the sea and transmits first position information on the equipment 2; wave receiving equipment 1 which transmits second position information on the wave receiving equipment 1 with a received wave signal which is obtained by receiving a direct wave from the sound source equipment 2 and a reflective sound from the target 3; sound source azimuth detection means 4 which detects an azimuth of the sound source equipment 2 viewed from the wave receiving equipment 1 on the basis of the first and second position information; arrival azimuth detection means 5 which detects a sound source arrival azimuth 6, which is an arrival azimuth of the direct wave from the sound source equipment 2, and a target arrival azimuth 7, which is an arrival azimuth of the reflective sound from the target 3, on the basis of the received wave signal; a subtractor circuit 8 which calculates difference between them; and target azimuth detection means 9 which detects an azimuth of the target 3 on the basis of the azimuth detected by the sound source azimuth detection means 4, and the difference calculated by the subtractor circuit 8. Here, the arrival azimuth detection means 5 and the subtractor circuit 8 constitute calculation means.

It is possible to obtain a highly accurate target azimuth without a compass by calculating the difference between the sound source arrival azimuth 6 and target arrival azimuth 7 which are obtained from the received wave signal, and detecting the azimuth of the target 3 on the basis of the azimuth detected by the sound source azimuth detection means 4, and the difference calculated by the calculation means.

According to the second aspect of the present invention, a bistatic azimuth detection system comprising: sound source equipment which transmits a sound wave to a target in the sea and transmits first position information on the equipment; wave receiving equipment which transmits second position information on the wave receiving equipment with a received wave signal which is obtained by receiving a direct wave from the sound source equipment and a reflective sound from the target, and specific azimuth information on a specific azimuth obtained by a compass; first sound source azimuth detection means which detects an azimuth of the sound source equipment to a specific azimuth in the wave receiving equipment on the basis of the first and second position information; second sound source azimuth detection means which detects an arrival azimuth of the direct wave to the specific azimuth in the specific azimuth information on the basis of the received wave signal and the specific azimuth information; target azimuth detection means which detects a target azimuth, which is an arrival azimuth of the reflective sound, to the specific azimuth in the specific azimuth information on the basis of the received wave signal and the specific azimuth information; and azimuth correction means which corrects the target azimuth with the difference between the azimuth detected by the first detection means and the azimuth detected by the second detection means.

According to the second aspect of the present invention, the azimuth of the sound source equipment to a specific azimuth (for example, a magnetic north azimuth) is detected on the basis of the first and second position information, the arrival azimuth of the direct wave to a specific azimuth which a compass shows (for example, a magnetic north azimuth) is detected on the basis of the received wave signal, and the target azimuth to the specific azimuth is detected on the basis of the received wave signal and the specific azimuth information. Then, the target azimuth is corrected with the difference between the azimuth of the sound source equipment and the arrival azimuth of the direct wave. Hence, it is possible to perform highly accurate detection with no influence of the accuracy of a compass, an earth magnetism deviation, etc. which lead to azimuth errors.

The sound source equipment wirelessly transmits the first position information, and the wave receiving equipment wirelessly transmits the received wave signal and the second position information.

Each of the sound source equipment and the wave receiving equipment receives signals from satellites of the Global Positioning System to acquire longitude and latitude information on the equipment as the position information on the equipment.

According to the third aspect of the present invention, a bistatic azimuth detection method of a bistatic azimuth detection system which includes sound source equipment, which transmits a sound wave to a target in the sea and transmits first position information on the equipment, and wave receiving equipment, which transmits second position information on the wave receiving equipment with a received wave signal which is obtained by receiving a direct wave from the sound source equipment and a reflective sound from the target, comprising: a first step of detecting an azimuth of the sound source equipment viewed from the wave receiving equipment on the basis of the first and second position information; a second step of detecting a sound source arrival azimuth, which is an arrival azimuth of the direct wave from the sound source equipment, and a target arrival azimuth, which is an arrival azimuth of the reflective sound from the target, on the basis of the received wave signal to calculate difference between them; and a third step of detecting an azimuth of the target on the basis of the azimuth detected at the first step, and the difference calculated at the second step.

Similarly to the first aspect of the present invention, It is possible to obtain a highly accurate target azimuth without a compass by calculating the difference between the sound source arrival azimuth 6 and target arrival azimuth 7 which are obtained from the received wave signal, and detecting the azimuth of the target 3 on the basis of the azimuth detected by the sound source azimuth detection means 4, and the difference calculated by the calculation means.

According to the fourth aspect of the present invention, a bistatic azimuth detection method of a bistatic azimuth detection system which includes sound source equipment which transmits a sound wave to the target in the sea and transmits first position information on the equipment, and wave receiving equipment which transmits second position information on the wave receiving equipment with a received wave signal which is obtained by receiving a direct wave from the sound source equipment and a reflective sound from the target, and specific azimuth information on a specific azimuth obtained by a compass, comprising: a first step of detecting an azimuth of the sound source equipment to a specific azimuth in the wave receiving equipment on the basis of the first and second position information; a second step of detecting an arrival azimuth of the direct wave to the specific azimuth in the specific azimuth information on the basis of the received wave signal and the specific azimuth information; a third step of detecting a target azimuth, which is an arrival azimuth of the reflective sound, to the specific azimuth in the specific azimuth information on the basis of the received wave signal and the specific azimuth information; and a fourth step of correcting the target azimuth with difference between the azimuth detected at the first step and the azimuth detected at the second step.

Similarly to the second aspect of the present invention, the azimuth of the sound source equipment to a specific azimuth (for example, a magnetic north azimuth) is detected on the basis of the first and second position information, the arrival azimuth of the direct wave to a specific azimuth which a compass shows (for example, a magnetic north azimuth) is detected on the basis of the received wave signal, and the target azimuth to the specific azimuth is detected on the basis of the received wave signal and the specific azimuth information. Then, the target azimuth is corrected with the difference between the azimuth of the sound source equipment and the arrival azimuth of the direct wave. Hence, it is possible to perform highly accurate detection with no influence of the accuracy of a compass, an earth magnetism deviation, etc. which lead to azimuth errors.

BRIEF DESCRIPTION OF THE DRAWINGS

FIGS. 5A to 5C are explanatory diagrams of an azimuth detection method in the first embodiment of the present invention;

DETAILED DESCRIPTION OF THE PREFERRED EMBODIMENTS

Figure 1:
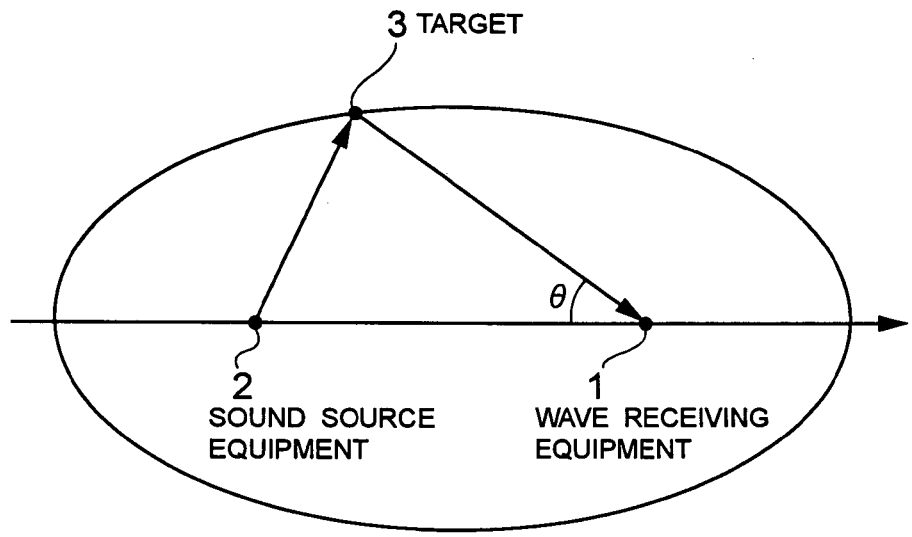
FIG. 1 is a diagram showing a configuration of a principal part of the present invention.
Figure 2:
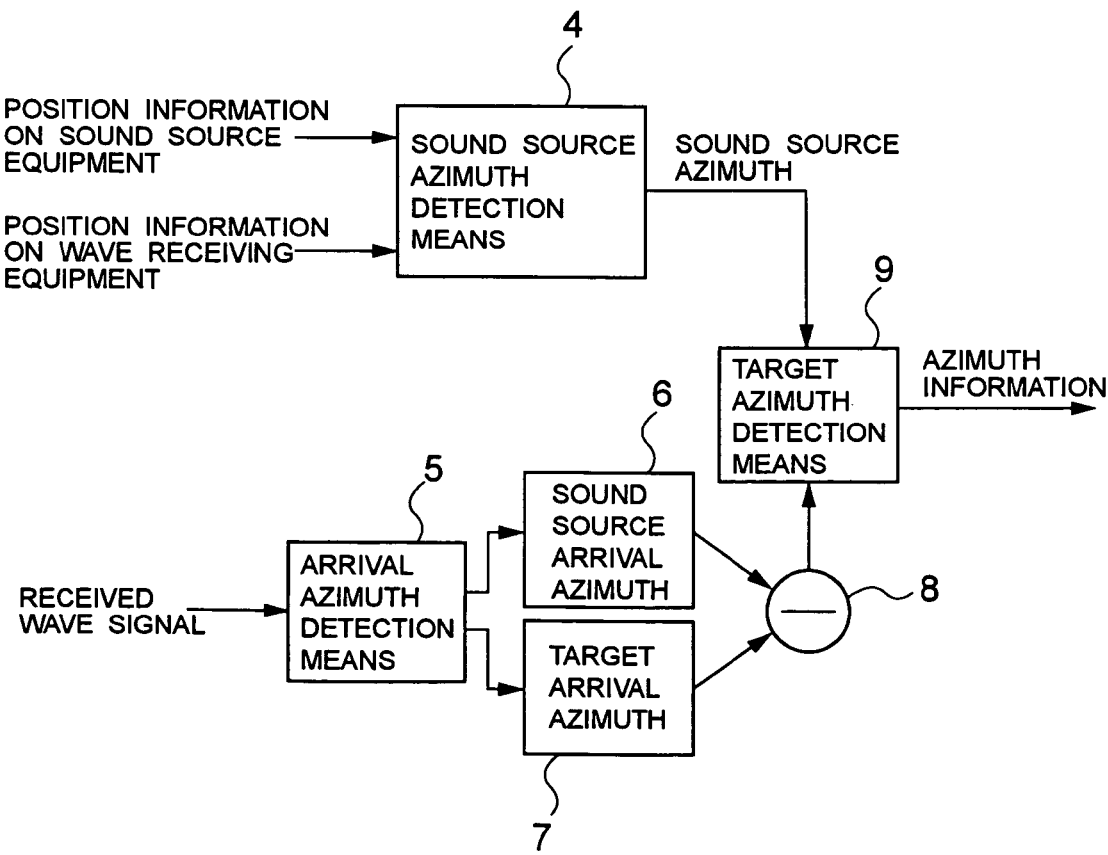
FIG. 2 is a block diagram of another principal part of the present invention.
Figure 3:
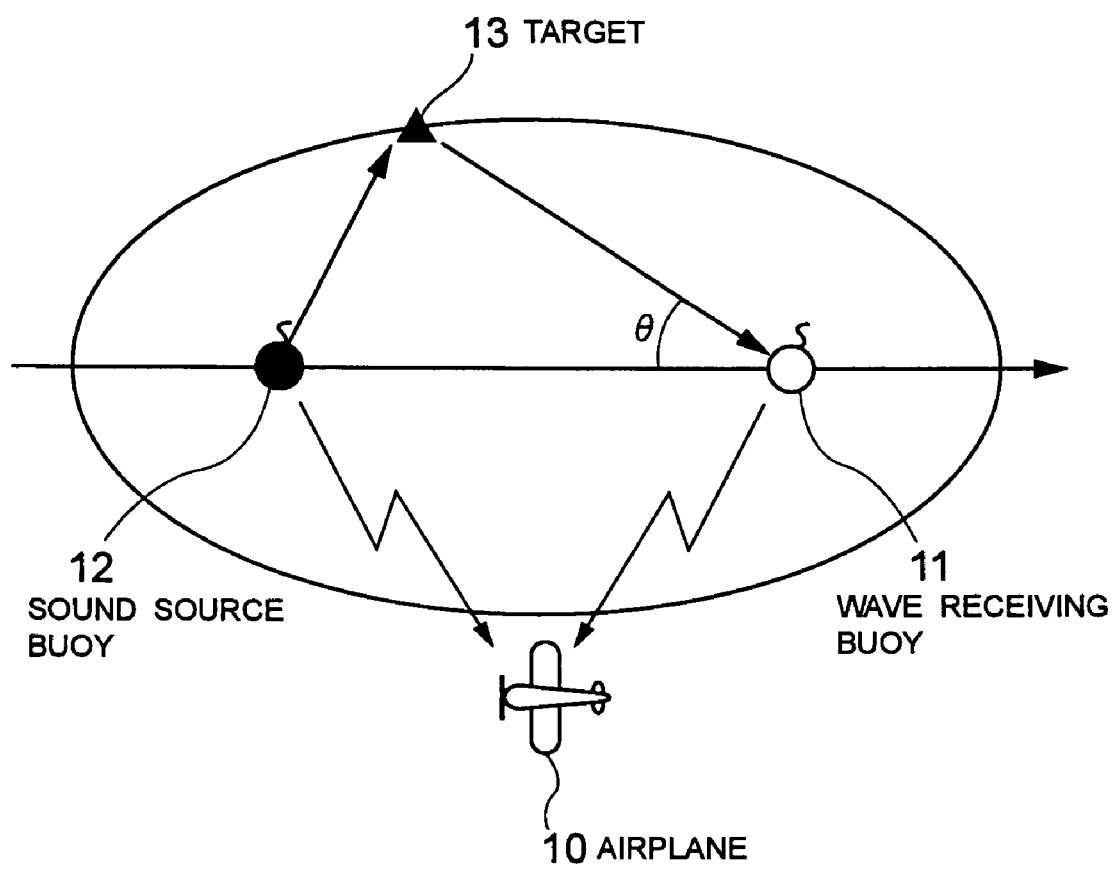
FIG. 3 is a diagram showing a configuration of a bistatic azimuth detection system according to a first embodiment of the present invention.

Embodiments of the present invention will be explained with drawings. FIG. 3 is a diagram showing a configuration of a bistatic azimuth detection system according to a first embodiment of the present invention. In FIG. 3, a wave receiving buoy 11 is wave receiving equipment thrown into the sea from an airplane 10, and transmits received information (received wave signal) obtained by receiving a sound in the sea (a sound wave radiated from a sound source buoy 12, its reflective sound, a reverberant sound, sea noise, etc.) with GPS position information on the wave receiving buoy 11, which is obtained by using the Global Positioning System (GPS), to the airplane 10 by radio.

The sound source buoy 12 is sound source equipment thrown into the sea from the airplane 10, and transmits the GPS position information on the sound source buoy 12 by radio while transmitting a sound wave at a specific frequency into the sea by the control of the airplane 10. A target 13 is in the sea and reflects a sound wave transmitted by the sound source buoy 12. The airplane 10 mounts an arithmetic unit which calculates arrival azimuths of a sound transmitted from the sound source buoy 12, and a reflective sound from the target 13 on the basis of the received signal from the wave receiving buoy 11, and GPS position information on the wave receiving buoy 11 and sound source buoy 12.

Figure 4:
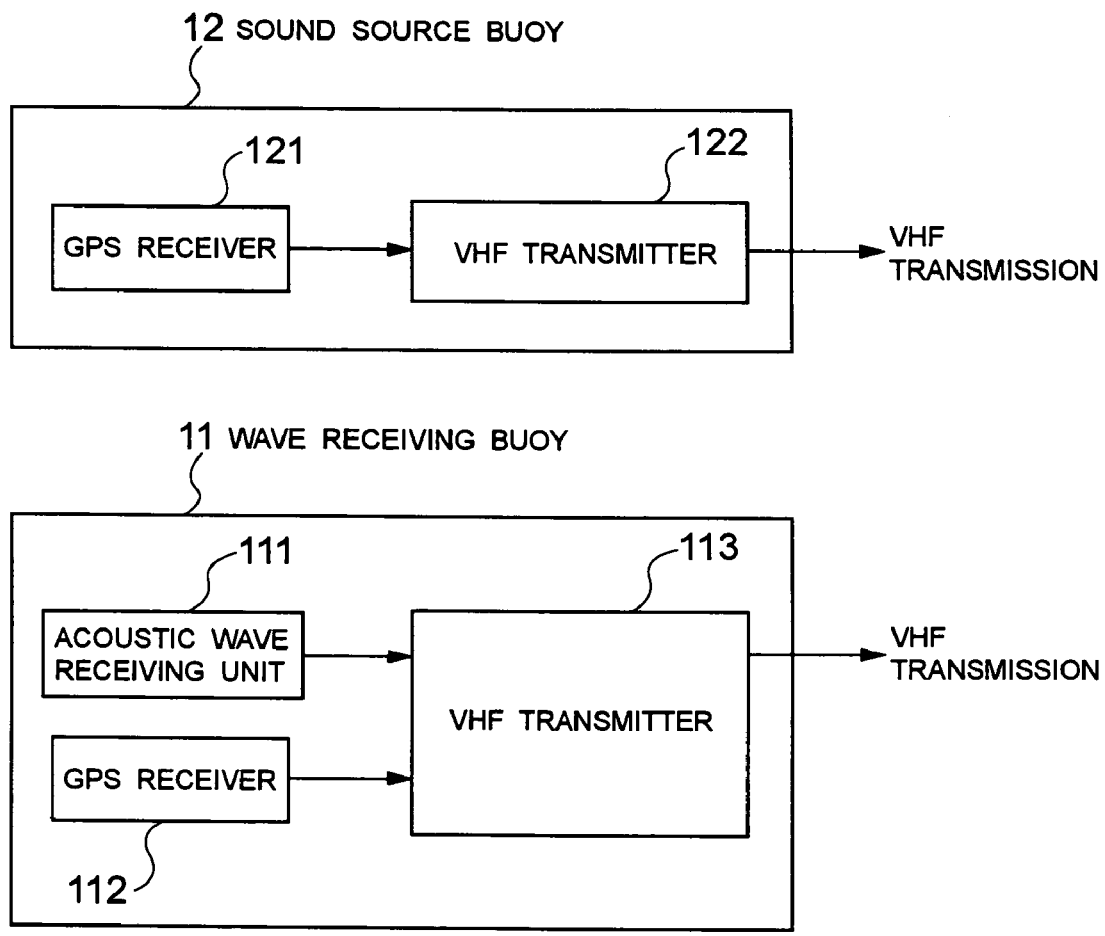
FIG. 4 is a block diagram of the wave receiving buoy and sound source buoy in FIG. 3.

FIG. 4 is a block diagram of the wave receiving buoy 11 and sound source buoy 12 in FIG. 3. In FIG. 4, the wave receiving buoy 11 comprises an acoustic wave receiving unit 111, a GPS receiver 112, and a VHF transmitter 113. The acoustic wave receiving unit 111 is a circuit which receives a sound wave in the sea, converts the received sound into an electric signal, performs signal processing of the electric signal such as amplification, and outputs the signal as a received wave signal, and the detailed configuration itself is well known up to now. Moreover, since it is not directly related to the present invention, the explanation of its detailed configuration will be omitted.

The GPS receiver 112 receives GPS signals transmitted from a plurality of satellites (hereinafter GPS Satellites) which constitute the well-known GPS, and outputs the position information of latitude and longitude of a position where the wave receiving buoy 11 exists, and time information by a well-known method. The VHF transmitter 113 transmits to the airplane 10 the received wave signal from the acoustic wave receiving unit 111 and an output signal from the GPS receiver 112 as a signal in a VHF band.

The sound source buoy 12 comprises a GPS receiver 121 and a VHF transmitter 122, as shown in FIG. 4. The GPS receiver 121 receives GPS signals transmitted from the GPS Satellites, and outputs the position information of latitude and longitude of a position where the sound source buoy 12 exist, and time information by a well-known method. The VHF transmitter 122 transmits to the airplane 10 the position information and time information from the GPS receiver 121 as a signal in a VHF band. In addition, the sound source buoy 12 has a receiving unit (not shown) which receives a radio control signal from the airplane 10, and a sound wave generator (not shown) which is driven on the basis of the control signal and transmits a sound wave.

In the first embodiment, a sound wave is transmitted in the sea from the sound source buoy 12 by the control of the airplane 10 in FIG. 3, and the target 13 in the sea is made to reflect the sound wave. The acoustic wave receiving unit 111 receives a direct sound wave from the sound source buoy 12, a reflective sound from the target 13, a reverberant sound, sea noise, etc., converts the received sound into an electric signal, and outputs the signal as a received wave signal. The VHF transmitter 113 transmits the received signal to the airplane 10 together with the position information on the wave receiving buoy 11 and time information from the GPS receiver 112.

The arithmetic unit mounted in the airplane 10 receives the signal transmitted from the wave receiving buoy 11, the position information on the sound source buoy 12 and time information, which is transmitted from the sound source buoy 12, etc., and detects an azimuth of the target 13 by the following method on the basis of the received information.

Next, an azimuth detection method according to the first embodiment will be explained in detail with reference to FIGS. 5A to 5C. The arithmetic unit mounted in the airplane 10 first detects arrival azimuths of a direct wave and a reflective sound by a well-known method on the basis of the received information. FIG. 5A shows a sound source arrival azimuth angle X° of a sound wave (direct wave), which is transmitted from the sound source buoy 12 and is directly received by the wave receiving buoy 11, to a reference axis of the wave receiving buoy 11. FIG. 5B shows a target arrival azimuth angle Y° of a reflective sound, which is received by the wave receiving buoy 11 after a sound wave transmitted from the sound source buoy 12 is reflected by the target 13, to the reference axis of the wave receiving buoy 11.

Then, the arithmetic unit mounted in the airplane 10 detects difference α (=X−Y) between the above-described sound source arrival azimuth X° and target arrival azimuth Y°. Next, the arithmetic unit draws a transition diagram as shown in FIG. 5C by the position information (latitude and longitude) detected by the GPS receiver 121 of the sound source buoy 12, and the position information (latitude and longitude) detected by the GPS receiver 112 of the wave receiving buoy 11. Further, it detects an azimuth angle β of a straight line, which ties the wave receiving buoy 11 and the sound source buoy 12, to the magnetic north azimuth. In addition, the magnetic north azimuth is not that obtained with a compass, but is obtained from the transition diagram.

Then, as shown in FIG. 5C, the arithmetic unit detects the azimuth (target azimuth) of the target 13 to the magnetic north azimuth by the operation of (β−α) by using the differential azimuth angle α between the arrival azimuth of the direct wave and the arrival azimuth of the reflective sound and the azimuth angle β obtained by the position information on the wave receiving buoy 11 and sound source buoy 12. Thus, the first embodiment obtains the position of the sound source buoy 12, and the position of the wave receiving buoy 11 in high accuracy by using the GPS, and furthermore, detects the azimuth of the target from the difference between the arrival azimuth of the direct wave and the arrival azimuth of the reflective sound. Hence, it is possible to perform highly accurate azimuth detection with no influence of the accuracy of a compass, an earth magnetism deviation, etc. which lead to conventional azimuth errors.

Figure 6:
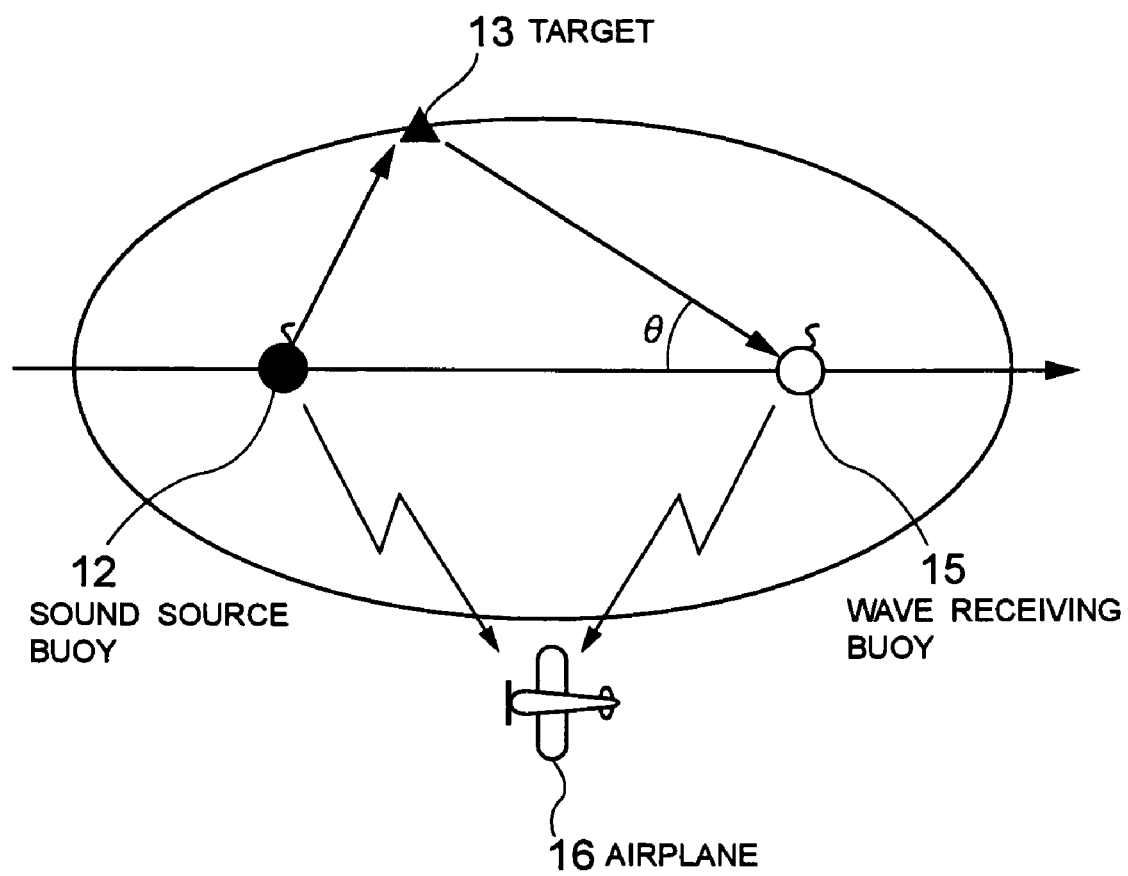
FIG. 6 is a diagram showing a configuration of a bistatic azimuth detection system according to a second embodiment of the present invention.

Next, a second embodiment of the present invention will be explained. FIG. 6 is a diagram showing a configuration of a bistatic azimuth detection system according to the second embodiment of the present invention. In FIG. 6, the same characters are assigned to the same components as those in FIG. 3. In FIG. 6, a wave receiving buoy 15 is wave receiving equipment thrown into the sea from an airplane 16, and transmits by radio the received information, obtained by receiving a sound in the sea, to the airplane 16 with GPS position information on the wave receiving buoy 11.

The sound source buoy 12 is sound source equipment thrown into the sea from the airplane 16, and transmits the GPS position information on the sound source buoy 12 by radio while transmitting a sound wave into the sea by the control of the airplane 16. A target 13 is in the sea and reflects a sound wave transmitted by the sound source buoy 12. The airplane 16 mounts an arithmetic unit which calculates arrival azimuths of a sound transmitted from the sound source buoy 12, and a reflective sound from the target 13 on the basis of the received signal from the wave receiving buoy 15, and GPS position information on the wave receiving buoy 15 and sound source buoy 12.

Figure 7:
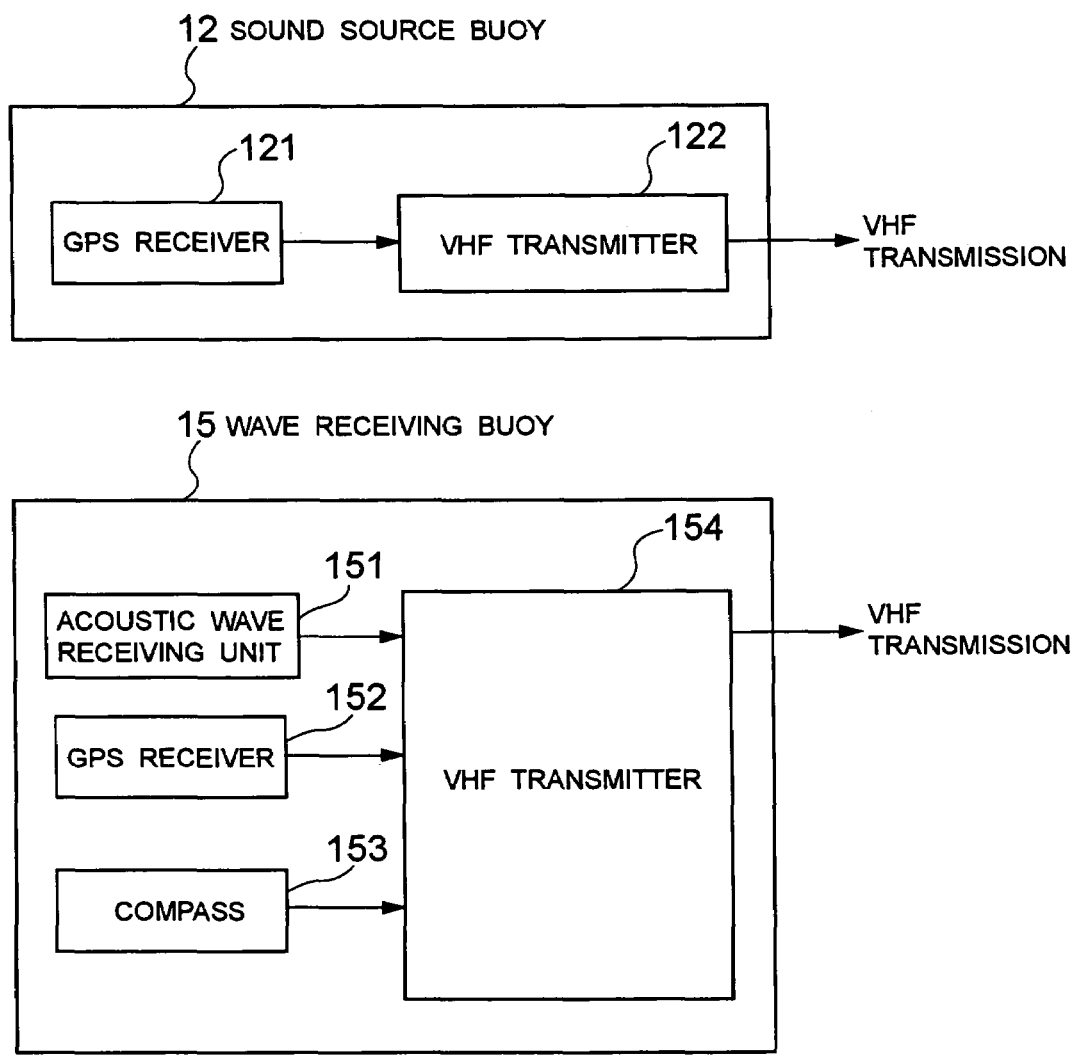
FIG. 7 is a block diagram of the wave receiving buoy and sound source buoy in FIG. 6.

FIG. 7 is a block diagram of the wave receiving buoy 15 and sound source buoy 12 in FIG. 6. In FIG. 7, the wave receiving buoy 15 comprises an acoustic wave receiving unit 151, a GPS receiver 152, a compass 153, and a VHF transmitter 154. The acoustic wave receiving unit 151 is a circuit which receives a sound wave in the sea, converts the received sound into an electric signal, performs the amplification of the electric signal or the like, and outputs the signal as a received wave signal, and the detailed configuration itself is well known up to now. Moreover, since it is not directly related to the present invention, the explanation of its detailed configuration will be omitted.

The GPS receiver 152 receives GPS signals transmitted from GPS Satellites, and outputs the position information of latitude and longitude of a position, where the wave receiving buoy 15 exists, and time information by a well-known method. The compass 153 outputs the magnetic north azimuth to the reference axis of the wave receiving buoy 15. The VHF transmitter 154 transmits to the airplane 16 the received wave signal from the acoustic wave receiving unit 151, an output signal from the GPS receiver 112, and an output signal from the compass 153 as a signal in a VHF band. In addition, the configuration of the sound source buoy 12 is the same as that of the first embodiment.

The arithmetic unit mounted in the airplane 16 receives the signal transmitted from the wave receiving buoy 15, the position information on the sound source buoy 12 and time information, which is transmitted from the sound source buoy 12, etc., and detects an azimuth of the target 13 by the following method on the basis of the received information.

Figure 8A:
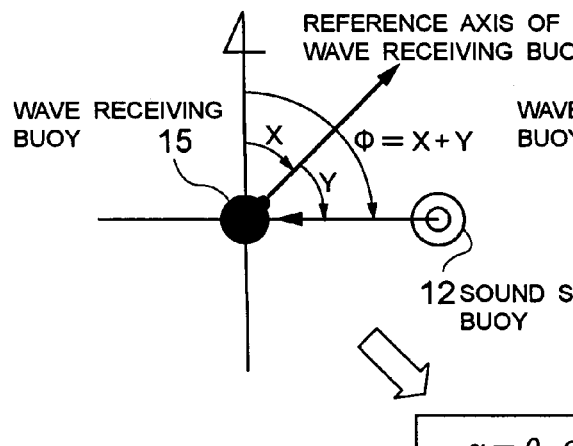
FIGS. 8A to 8C are explanatory diagrams of an azimuth detection method in the second embodiment of the present invention.

Next, an azimuth detection method according to the second embodiment will be explained in detail with reference to FIGS. 8A to 8C. On the basis of the received information, the arithmetic unit mounted in the airplane 16 first detects a sound source arrival azimuth Y° of the sound wave (direct wave), which is transmitted from the sound source buoy 12 and is directly received by the wave receiving buoy 15, to the reference axis of the wave receiving buoy 15, as shown in FIG. 8A by using a well known method. In addition, on the basis of the information from the compass 153 of the wave receiving buoy 15, the arithmetic unit detects the magnetic north azimuth of the reference axis of the wave receiving buoy 15. In FIG. 8A, X° shows the magnetic north azimuth of the reference axis of the wave receiving buoy 15.

Next, the arithmetic unit mounted in the airplane 16 calculates a sum (X+Y) of the above-described arrival azimuth Y° and the magnetic north azimuth X°, and detects it as an azimuth angle φ (=X+Y) of the sound source buoy 12.

Figure 8B:
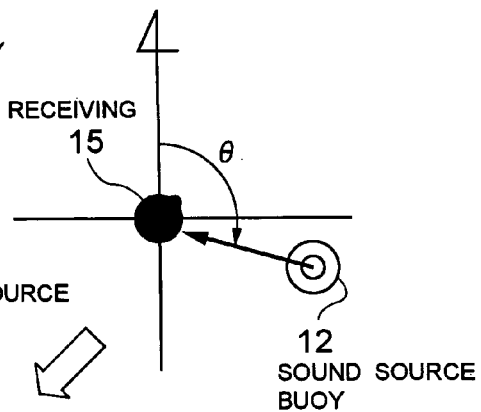

Then, as shown in FIG. 8B, the arithmetic unit mounted in the airplane 16 detects an azimuth angle θ of the sound source buoy 12 to the magnetic north azimuth of the wave receiving buoy 15 from the position information (latitude and longitude) detected by the GPS receiver 121 of the sound source buoy 12, and the position information (latitude and longitude) detected by the GPS receiver 152 of the wave receiving buoy 15. In addition, the magnetic north azimuth is not that obtained with the compass 153, but is obtained from a transition diagram.

Then, the arithmetic unit calculates difference between the azimuth angle φ of the sound source buoy 12, which is obtained by using the compass 153, and the azimuth angle θ of the sound source buoy 12, which is obtained by using the GPS, and detects it as an azimuth correction value α. If there were no error in the compass 153 and azimuth detection, it would be φ=θ, but actually, the error α arises due to magnetic variation, the accuracy of a compass, etc.

Figure 8C:
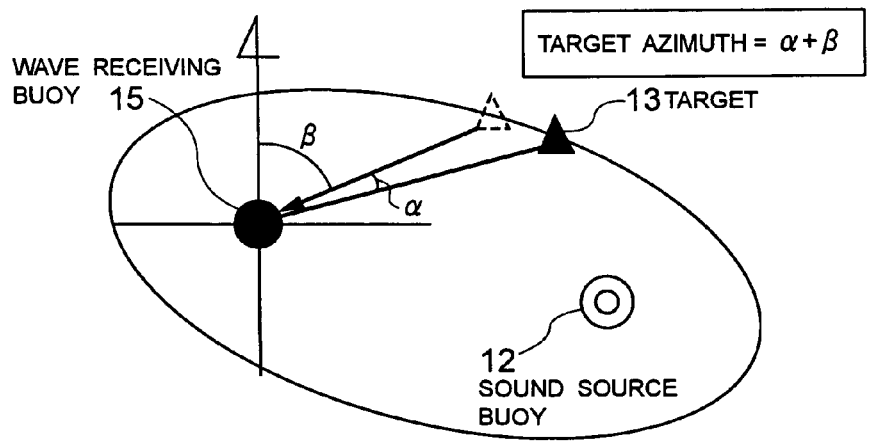
Figure 9:
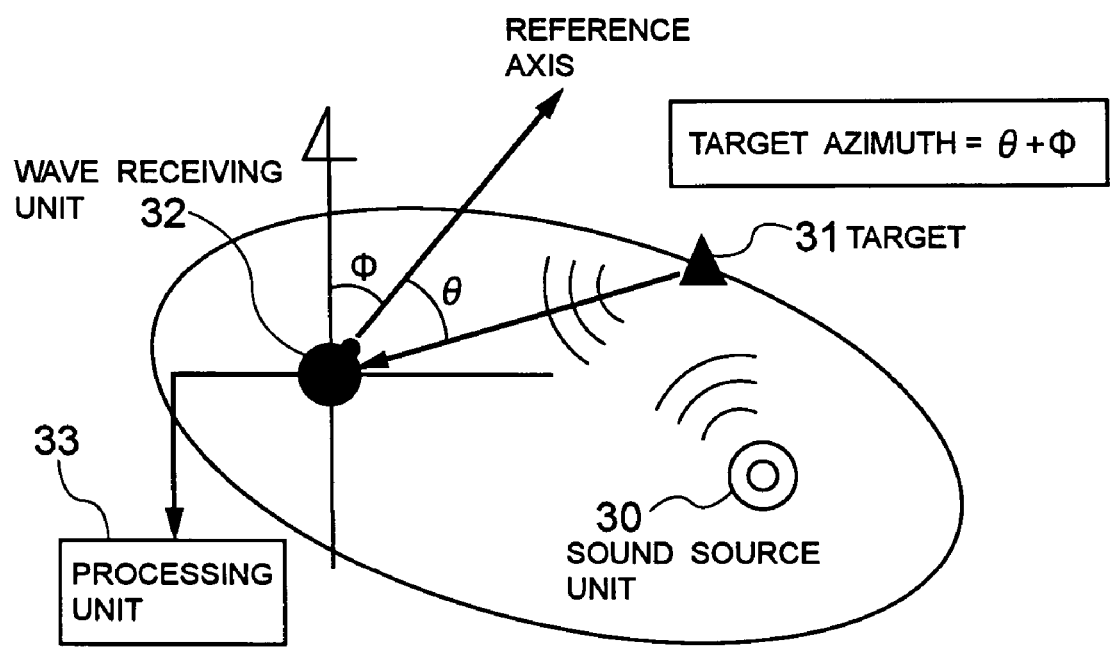
FIG. 9 is an explanatory diagram of a conventional azimuth detection method.

Next, as shown in FIG. 8C, the arithmetic unit detects an arrival azimuth angle β of the reflective sound from the target 13 to the magnetic north azimuth of the reference axis of the wave receiving buoy 15 by the conventional azimuth detection method, and further adds the azimuth correction value α to the arrival azimuth angle β to detect a highly accurate azimuth of the target 13.

Thus, before detecting the azimuth of the target 13, the second embodiment calculates the difference between the azimuth angle φ of the sound source buoy 12, which is obtained by using the compass 153, and the azimuth angle θ of the sound source buoy 12, which is obtained by using the GPS, to obtain the correction value α. Then, the second embodiment corrects the value β, calculated by the conventional detection method, with the correction value α to obtain the azimuth of the target 13. Hence, it becomes possible to perform highly accurate detection with no influence of the accuracy of a compass, the earth magnetism deviation, etc. which lead to conventional azimuth errors.

In addition, this invention is not limited to the above embodiments, and for example, it is possible to adopt another sound source equipment as the sound source buoy 12, and it is possible to adopt another wave receiving equipment as the wave receiving buoy 12. Furthermore, although the arithmetic unit which performs azimuth detection is explained as what is mounted in an airplane, it is also possible to mount it in a vessel or the like. Moreover, it is also possible to provide two or more wave receiving buoys and one or more sound source buoys.

What is claimed is:

1. A bistatic azimuth detection system comprising:
   sound source equipment which transmits a sound wave to a target and transmits first position information on the sound source equipment;
   wave receiving equipment which transmits second position information on the wave receiving equipment with a received wave signal which is obtained by receiving a direct wave from the sound source equipment and a reflective sound from the target;
   sound source azimuth detection means which detects an azimuth of the sound source equipment viewed from the wave receiving equipment on the basis of the first and second position information;
   calculation means which detects a sound source arrival azimuth, which is an arrival azimuth of the direct wave from the sound source equipment, and a target arrival azimuth, which is an arrival azimuth of the reflective sound from the target, on the basis of the received wave signal, to calculate difference between them; and
   target azimuth detection means which detects an azimuth of the target on the basis of the azimuth detected by the sound source azimuth detection means, and the difference calculated by the calculation means.

2. A bistatic azimuth detection system comprising:
   sound source equipment which transmits a sound wave to a target and transmits first position information on the equipment;
   wave receiving equipment which transmits second position information on the wave receiving equipment with a received wave signal which is obtained by receiving a direct wave from the sound source equipment and a reflective sound from the target, and specific azimuth information on a specific azimuth obtained by a compass;
   first sound source azimuth detection means which detects an azimuth of the sound source equipment to a specific azimuth in the wave receiving equipment on the basis of the first and second position information;
   second sound source azimuth detection means which detects an arrival azimuth of the direct wave to the specific azimuth in the specific azimuth information on the basis of the received wave signal and the specific azimuth information;
   target azimuth detection means which detects a target azimuth, which is an arrival azimuth of the reflective sound, to the specific azimuth in the specific azimuth information on the basis of the received wave signal and the specific azimuth information; and
   azimuth correction means which corrects the target azimuth with the difference between the azimuth detected by the first detection means and the azimuth detected by the second detection means.

3. The bistatic azimuth detection system according to claim 1, wherein the sound source equipment wirelessly transmits the first position information, and wherein the wave receiving equipment wirelessly transmits the received wave signal and the second position information.

4. The bistatic azimuth detection system according to claim 1, wherein each of the sound source equipment and the wave receiving equipment receives signals from satellites of the Global Positioning System to acquire longitude and latitude information on the equipment as the position information on the equipment.

5. A bistatic azimuth detection method of a bistatic azimuth detection system which includes sound source equipment, which transmits a sound wave to a target and transmits first position information on the equipment, and wave receiving equipment, which transmits second position information on the wave receiving equipment with a received wave signal which is obtained by receiving a direct wave from the sound source equipment and a reflective sound from the target, comprising:
   a first step of detecting an azimuth of the sound source equipment viewed from the wave receiving equipment on the basis of the first and second position information;
   a second step of detecting a sound source arrival azimuth, which is an arrival azimuth of the direct wave from the sound source equipment, and a target arrival azimuth, which is an arrival azimuth of the reflective sound from the target, on the basis of the received wave signal to calculate difference between them; and
   a third step of detecting an azimuth of the target on the basis of the azimuth detected at the first step, and the difference calculated at the second step.

6. A bistatic azimuth detection method of a bistatic azimuth detection system which includes sound source equipment which transmits a sound wave to the target and transmits first position information on the equipment, and wave receiving equipment which transmits second position information on the wave receiving equipment with a received wave signal which is obtained by receiving a direct wave from the sound source equipment and a reflective sound from the target, and specific azimuth information on a specific azimuth obtained by a compass, comprising:
   a first step of detecting an azimuth of the sound source equipment to a specific azimuth in the wave receiving equipment on the basis of the first and second position information;
   a second step of detecting an arrival azimuth of the direct wave to the specific azimuth in the specific azimuth information on the basis of the received wave signal and the specific azimuth information;
   a third step of detecting a target azimuth, which is an arrival azimuth of the reflective sound, to the specific azimuth in the specific azimuth information on the basis of the received wave signal and the specific azimuth information; and
   a fourth step of correcting the target azimuth with difference between the azimuth detected at the first step and the azimuth detected at the second step.

7. The detection method according to claim 5, wherein the sound source equipment wirelessly transmits the first position information, and wherein the wave receiving equipment wirelessly transmits the received wave signal and the second position information.

8. The detection method according to claim 5, wherein each of the sound source equipment and the wave receiving equipment receives signals from satellites of the Global Positioning System to acquire longitude and latitude information on the equipment as the position information on the equipment.

9. A bistatic azimuth detection system comprising:

sound source equipment which transmits a sound wave to a target in the sea and transmits first position information on the sound source equipment;

wave receiving equipment which transmits second position information on the wave receiving equipment with a received wave signal which is obtained by receiving a direct wave from the sound source equipment and a reflective sound from the target;

a sound source azimuth detector which detects an azimuth of the sound source equipment viewed from the wave receiving equipment on the basis of the first and second position information;

a calculator which detects a sound source arrival azimuth, which is an arrival azimuth of the direct wave from the sound source equipment, and a target arrival azimuth, which is an arrival azimuth of the reflective sound from the target, on the basis of the received wave signal, to calculate difference between them; and a target azimuth detector which detects an azimuth of the target on the basis of the azimuth detected by the sound source azimuth detector, and the difference calculated by the calculator.

10. A bistatic azimuth detection system comprising:

sound source equipment which transmits a sound wave to a target in the sea and transmits first position information on the equipment;

wave receiving equipment which transmits second position information on the wave receiving equipment with a received wave signal which is obtained by receiving a direct wave from the sound source equipment and a reflective sound from the target, and specific azimuth information on a specific azimuth obtained by a compass;

a first sound source azimuth detector which detects an azimuth of the sound source equipment to a specific azimuth in the wave receiving equipment on the basis of the first and second position information;

a second sound source azimuth detector which detects an arrival azimuth of the direct wave to the specific azimuth in the specific azimuth information on the basis of the received wave signal and the specific azimuth information;

a target azimuth detector which detects a target azimuth, which is an arrival azimuth of the reflective sound, to the specific azimuth in the specific azimuth information on the basis of the received wave signal and the specific azimuth information; and an azimuth correction device which corrects the target azimuth with the difference between the azimuth detected by the first sound source azimuth detector and the azimuth detected by the second source azimuth detector.

11. The bistatic azimuth detection system according to claim 9, wherein the sound source equipment wirelessly transmits the first position information, and wherein the wave receiving equipment wirelessly transmits the received wave signal and the second position information.

12. The bistatic azimuth detection system according to claim 9, wherein each of the sound source equipment and the wave receiving equipment receives signals from satellites of the Global Positioning System to acquire longitude and latitude information on the equipment as the position information on the equipment.

13. The bistatic azimuth detection system according to claim 1, wherein the target is in the sea.

14. The bistatic azimuth detection system according to claim 2, wherein the target is in the sea.

15. The detection method according to claim 5, wherein the target is in the sea.

16. The detection method according to claim 6, wherein the target is in the sea.

* * * * *